Figure 2:
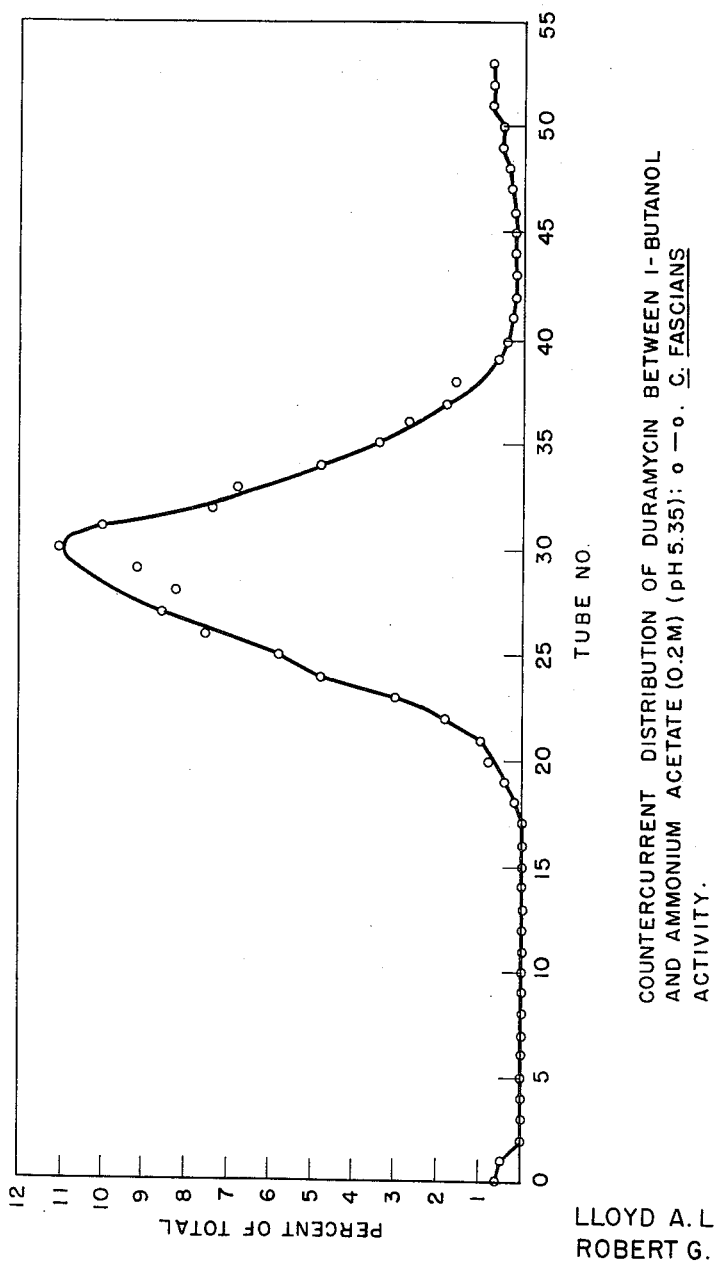

Dec. 23, 1958 L. A. LINDENFELSER ET AL 2,865,815
PRODUCTION OF ANTIBIOTIC MIXTURE HAVING ANTIBACTERIAL
AND ANTIFUNGAL ACTIVITY
Filed Feb. 8, 1957 2 Sheets-Sheet 1

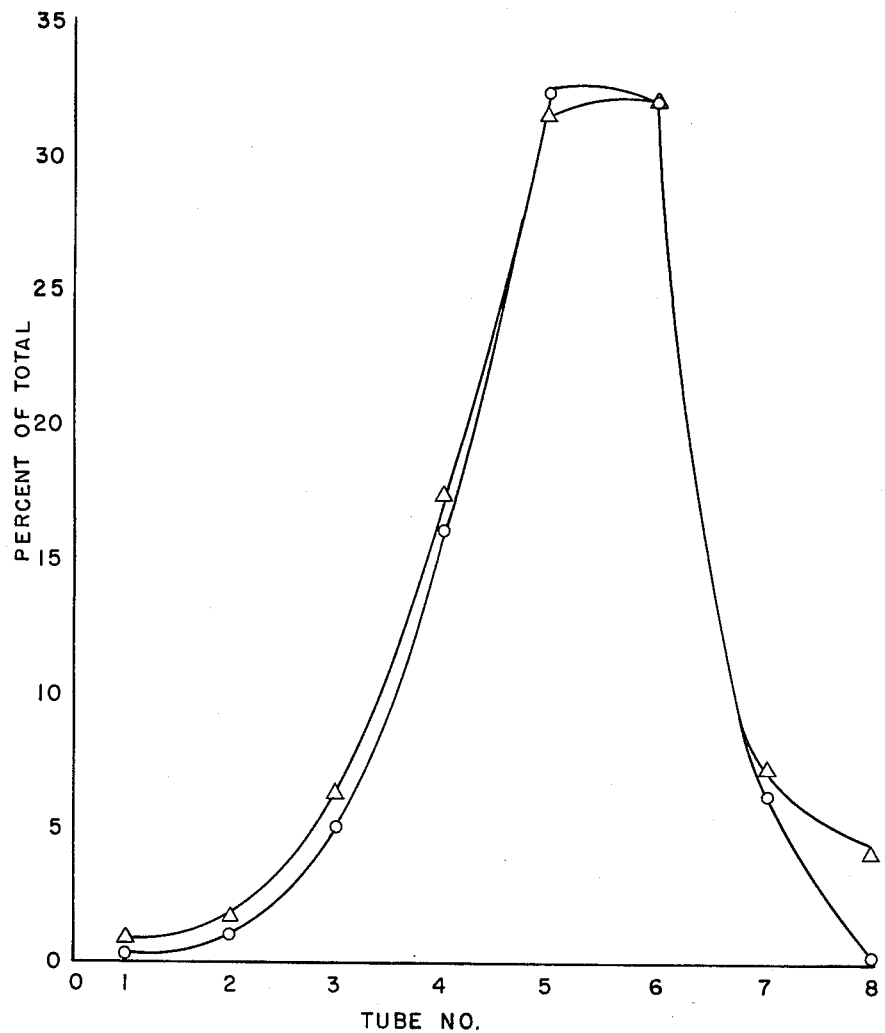

COUNTERCURRENT DISTRIBUTION OF DURAMYCIN BETWEEN 2-BUTANOL
AND 0.01N AMMONIUM HYDROXIDE: o—o, B. SUBTILIS ACTIVITY;
Δ—Δ, WEIGHT. THE LOWER PHASE WAS MOVED.

FIG. 1.

INVENTORS
LLOYD A. LINDENFELSER
ROBERT G. BENEDICT
ODETLE L. SHOTWELL
THOMAS G. PRIDHAM
FRANK H. STODOLA
RICHARD W. JACKSON

BY
R. Hoffman
ATTORNEY

INVENTORS
LLOYD A. LINDENFELSER
ROBERT G. BENEDICT
ODETLE L. SHOTWELL
THOMAS G. PRIDHAM
FRANK H. STODOLA
RICHARD W. JACKSON

BY
R. Hoffman, ATTORNEY

2,865,815

PRODUCTION OF ANTIBIOTIC MIXTURE HAVING ANTIBACTERIAL AND ANTIFUNGAL ACTIVITY

Lloyd A. Lindenfelser, Tremont, and Robert G. Benedict, Odette L. Shotwell, Thomas G. Pridham, Frank H. Stodola, and Richard W. Jackson, Peoria, Ill., assignors to the United States of America as represented by the Secretary of Agriculture Application February 8, 1957, Serial No. 639,174

7 Claims. (Cl. 195—80)

(Granted under Title 35, U. S. Code (1952), sec. 266)

A non-exclusive, irrevocable, royalty-free license in the invention herein described, throughout the world for all purposes of the United States Government with the power to grant sublicenses for such purposes, is hereby granted to the Government of the United States of America.

This invention relates to the production of antibiotic substances and particularly to the production of a mixture of antibiotics by culture of a hitherto unknown microorganism.

In the accompanying drawings,

Figure 1 represents the results of an eight separatory funnel countercurrent distribution of one of the antibiotics produced according to this invention and Figure 2 represents the results of a 54-tube countercurrent separation.

We have found that a new strain of microorganism, *Streptomyces cinnamomeus* forma *azacoluta*, elaborates a plurality of antibiotics. The antibiotic mixture so produced exhibits powerful antibacterial, antiyeast, and antifungal activity and is of particular value in the prevention and control of rust, powdery mildew, and other plant diseases.

The description of the cultural characters of this new strain of microorganism, *Streptomyces cinnamomeus* forma *azacoluta* is given below and in Tables 1 and 2. (The colors where "R" is written are those of Ridgway "Color Standards and Nomenclature.") Descriptive material has been obtained through application of the general techniques recommended for identification and characterization of Streptomycetes by Hesseltine, Benedict, and Pridham, Annals N. Y. Acad. Sci., 60, 136–151 (1954). A culture of the new organism has been deposited with the Fermentation Section of the Northern Utilization Research Branch, U. S. Department of Agriculture, at Peoria, Illinois, and has been added to its permanent collection of microorganisms as NRRL B–1699.

*Streptomyces cinnamomeus* forma *azacoluta* f. nov.— Sporophores, $1.2–1.8\mu$ wide, oppositely branched and with both primary and secondary whorls (compound verticillate); spores in chains; elements of primary whorls $4.8–9.6\mu \times 1.2–1.8\mu$; elements of secondary whorls $7.2–9.6 \times 1.2–1.8\mu$; no spirals; at sporulation, aerial mycelium in colors near Shell Pink, Pale Pinkish Cinnamon, and Pale Pinkish Buff, Ridgway, 1912; reverse colors near Light Buff, Straw Yellow, Cream Color, and Chamois, Ridgway, 1912; generally less deeply pigmented aerial mycelium and reverse colors than with *S. cinnamomeus* NRRL B–1285 (through an error in orthography the NRRL B–1285 species was originally designated as *S. cinnamoneus*, whereas its proper name is *S. cinnamomeus*; the latter designation will be used herein); soluble pigment faint yellow, if any; peptone iron agar not blackened; in synthetic agar of Pridham and Gottlieb, D-glucose and i-inositol utilized; D-fructose sparingly utilized; L-xylose, L-arabinose, rhamnose, sucrose, lactose, raffinose, and salicin not utilized; produces an antibiotic mixture exhibiting antibacterial, antiyeast, and antifungal activity. Habitat and distribution: In soil from near Brighton, Iowa, U. S. A. Type form: *Streptomyces cinnamomeus* f. *azacoluta* in Northern Utilization Research Branch culture collection as NRRL B–1699.

TABLE 1

Cultural characteristics and morphology of Streptomyces cinnamomeus forma azacoluta, NRRL B–1699

| Medium | Amount of growth | Degree of sporulation | Color | | Morphology (× 100–× 400) |
|---|---|---|---|---|---|
| | | | Aerial mycelium and spores | Reverse | |
| Czapek's solution agar | Fair | Fair | Near Pale Pinkish Cinnamon R., Pl. XXIX. | Near Light Buff R., Pl. XV. | Compound whorls, no spirals. |
| Asparagine dextrose agar | do | Poor | Near Pale Pinkish Buff R., Pl. XXIX. | Near Straw Yellow R., Pl. XVI. | |
| Synthetic starch agar | Excellent | Excellent | Near Shell Pink R., Pl. XXVIII. | Near Cream Color R., Pl. XVI. | Do. |
| Carvajal's oatmeal agar | do | do | Near Shell Pink R., Pl. XXVIII. | Near Cream Color R., Pl. XVI. | Do. |
| Yeast extract agar | Fair | Poor | Near Pale Pinkish Buff R., Pl. XXIX. | Near Chamois R., Pl. XXX. | |
| Asheshov et al.'s tomato-paste oatmeal agar. | Excellent | Excellent | Near Shell Pink R., Pl. XXVIII. | Near Cream Color R., Pl. XVI. | Do. |
| Hickey and Tresner's "ami-dex" agar. | do | do | Near Shell Pink R., Pl. XXVIII. | Near Cream Color R., Pl. XVI. | Do. |
| Bennett's cobalt agar | do | do | Near Pale Pinkish Cinnamon R., Pl. XXIX. | Near Cream Color R., Pl. XVI. | Do. |

TABLE 2

*Comparison of Streptomyces cinnamomeus, NRRL B-1285 and S. cinnamomeus forma azacoluta, NRRL B-1699*

|  | S. cinnamomeus, NRRL B-1285 | S. cinnamomeus f. azacoluta, NRRL B-1699 |
|---|---|---|
| Antibiotic | Cinnamycin and unidentified antibiotic. | mixture. |
| Morphology | Compound verticillate, no spirals. | Compound verticillate, no spirals. |
| Spore color | Cinnamon pink | Cinnamon pink. |
| Reverse color | Buff to yellow-brown. | Buff to yellow. |
| Soluble Pigment | None to faint yellow. | None to faint yellow. |
| Blackening of peptone iron agar | − | − |
| Utilization[a] of: |  |  |
| L-xylose | − | −. |
| L-arabinose | − | −. |
| Rhamnose | − | −. |
| D-glucose | + | +. |
| D-fructose | ⊕ | ⊕. |
| Sucrose | − | −. |
| Lactose | − | −. |
| Raffinose | − | −. |
| i-Inositol | + | +. |
| Salicin | − | −. |
| Antibiotic spectrum[b] mm. inhibition: |  |  |
| Bacillus subtillis, NRRL B-971. | 20–25 | 20–25. |
| Sarcina lutea, Schroeter, NRRL B-1018. | 0 | 0. |
| Escherichia coli, (Migula) Castellani et Chalmers, NRRL B-766. | 0 | 0. |
| Candida albicans, NRRL Y-477. | 11–16 | 14–19. |
| Mucor ramannianus, A. Moeller, NRRL 1839. | 16–35 | 25–35. |

[a] Pridham and Gottlieb's method, 10 days incubation at 28–30° C. (−=no utilization; ⊕=sparse utilization; +=utilization).
[b] On Pridham and Gottlieb's D-glucose synthetic agar.

This new form of streptomyete has been studied and compared with whorled or verticillate Streptomyces, e. g., S. cinnamomeus Benedict et al., S. griseocarneus Benedict et al., S. netropsis Finlay et Sobin, S. reticuli (Waks. et Curtis) Waks. et Hen., S. albireticuli Nakazawa et al., S. rubrireticuli (Waks.) Waks. et al., S. albus (thiolutin-producer) Tanner et al., and S. viridoflavus Waks. et Taber. Comparison of the characteristics of strain NRRL B-1699 with published descriptions and actual comparison of growing cultures following the methods of Waksman, Millard and Burr, and Duche indicate a close relationship of this streptomycete to S. cinnamomeus. This close relationship is further illustrated in Table 2. Despite the close cultural relationship, a distinct and important difference between these streptomycetes does occur, that is, in the production of their antibiotics. Paper chromatography more clearly points out these differences as shown in Table 3. When our organism is cultivated in the medium recommended for the production of the antibiotic cinnamycin, no production of this antibiotic occurs. Likewise, when S. cinnamomeus, NRRL B-1285 is cultivated in media recommended for the production of our mixture of antibiotics, these are not produced.

TABLE 3

*Paper chromatographic comparison of culture filtrates from strain NRRL B-1699 and strain NRRL B-1285*

|  | Rf values[1] of zones of inhibition using— | |
|---|---|---|
|  | Bacillus subtilis, NRRL B-765 | Saccharomyces pastorianus, NRRL Y-139 |
| NRRL B-1699 filtrate | 0, 0.40 | 0.40, 0.75. |
| NRRL B-1285 filtrate | 0, 0.55 (cinnamycin) | 0.55 (cinnamycin). |
| Mixture of filtrates | 0, 0.40, 0.55 | 0.40, 0.55, 0.75. |

[1] Solvent was 1-butanol, pyridine, water (6:4:3).

It is to be understood that for the production of the mixture of antibiotics or the production of any one of these alone we do not wish to limit ourselves to this particular microorganism or to microorganisms which exactly conform to the above description. We especially wish to include the use of organisms which are mutants produced from the above-described organism by such agents as X-radiation, ultraviolet radiation, nitrogen mustard compounds, etc.

S. cinnamomeus forma azacoluta, NRRL B-1699 has a considerable activity against a variety of microorganisms. Table 4 illustrates its wide range of activity. The tests were conducted by the spectrum-plate, cut-plug, and spray-plate technique. In addition to this activity and more particularly to demonstrate the practical application of the crude mixture of antibiotics it has been found that the crude culture liquors will protect, in varying degrees of effectiveness, plants against the following listed dis-

TABLE 4

*Range of antibiotic activity of S. cinnamomeus f. azacoluta, NRRL B-1699*

| Test organism | NRRL | Zone of inhibition, mm. | Method |
|---|---|---|---|
| Agrobacterium tumefaciens (Smith et Townsend) Conn. | B-36 | 0 | Spectrum. |
| Corynebacterium fascians (Tilford) Dowson. | B-190 | 15 | Do. |
| Bacterium stewartii Erw. Smith | B-195 | 11 | Do. |
| Erwinia carotovora (Jones) Holland | B-204 | 0 | Do. |
| Pseudomonas phaseolicola (Burkholder) Dowson. | B-845 | 0 | Do. |
| Xanthomonas phaseoli (Erw. Smith) Dowson. | B-1460 | 18 / 2 | Cut-plug. / Spectrum. |
| Erwinia aroideae (Townsend) Holland. | B-134 | 0 | Spectrum. |
| Corynebacterium flaccumfaciens (Hedges) Dowson. | B-729 | 5 | Do. |
| Bacterium cattleyae Pavarino | B-835 | 5 | Do. |
| Pseudomonas cepacia Burkholder | B-1101 | 0 | Do. |
| Xanthomonas campestris (Pammel) Dowson. | B-1459 | 2 | Do. |
| Pseudomonas lachrymans (Smith et Bryan) Carsner. | B-1629 | 0 | Do. |
| Bacillus subtilis | B-971 | 22 | Do. |
| Bacillus subtilis (streptothricin-resistant). | B-972 | 22 | Do. |
| Aerobacter aerogenes (Kruse) Beijerinck. | B-199 | 16 | Do. |
| Candida albicans | Y-477 | 35 | Do. |
| Bodenheimer bacillus (streptomycin resistant). | B-962 | 17 | Do. |
| Staphylococcus pyogenes var. aureus Rosenbach. | B-313 | 10 | Do. |
| Escherichia coli | B-766 | 19 | Do. |
| Mycobacterium sp. Lehmann et Neumann. | B-692 | 22 | Do. |
| Brucella bronchiseptica | B-140 | 20 | Do. |
| Sarcina lutea | B-1018 | 10 | Do. |
| Pseudomonas aeruginosa | B-23 | 0 | Do. |
| Proteus vulgaris | B-417 | 5 | Do. |
| Trichoderma sp. | 1700 | trace a 0/14 / 17 | Cut-plug. / Spectrum. / Cut-plug. |
| Mucor ramannianus | 1839 | 18 / 30 | Spectrum. / Spray. |
| Cladosporium herbarum (Pers.) Link | 2175 | 12 / 12 | Cut-plug. / Spectrum. |
| Ustilago zeae (Bekm.) Ung | 2321 | trace / 15 | Cut-plug. / Spectrum. |
| Ophiostoma (Ceratostomella) ulmi (Buis.) Nannf. | 2356 | 10 / 17 | Cut-plug. / Spectrum. |
| Helminthosporium sp. (Link) Sacc. | 1679 | 13 | Spray. |
| Gibberella fujikuroi (Saw.) Wr. | 2278 | 12 / 7/15 | Spectrum. |
| Trichoderma sp. | 1700 | 35 | Spray. |
| Gibberella fujikuroi | 2278 |  |  |
| Fusarium lycopersici var. bulbigenum (Sacc.) Hansen et Snyder. | 1985 | 20 | Do. |
| Cladosporium herbarum | 2175 |  |  |
| Ceratostomella ulmi | 2356 | 40 | Do. |
| Ustilago zeae | 2321 |  |  |
| Verticillium albo-atrum R. et Ber. | 1204 | 0/22 | Spectrum. |
| Cephalosporium sp. Corda | 1866 | 5/20 | Do. |
| Fusarium aquaductuum (Radl. et Rab.) Sacc. | 2503 | 17 | Do. |
| Penicillium notatum Westling | 832 | 10 | Do. |
| Aspergillus fumigatus Fresenius | 1217B | 6/15 | Do. |
| Rhizoctonia solani Kühn | 2355 | 3 | Do. |
| Colletotrichum circinans (Berk.) Vogl. | 2504 | 15/25 | Do. |
| Fusarium lycopersici var. bulbigenum. | 1985 | 0/14 | Do. | a Slant line "/" indicates partial inhibition with zone to the extent of the second number; complete inhibition occurred to extent of first number.

eases: bean rust; wheat stem rust; snap bean anthracnose; lima bean downy mildew; bean powdery mildew; and bluegrass powdery mildew in greenhouse tests. Its effect on bean rust and wheat stem rust are particularly marked in greenhouse tests.

Culture liquors have been found to prevent growth of *Clostridium botulinum* (Van Ermengem) Holland, NRRL B–1218 (N. C. A. A., 62–A) completely at dilutions up to 1:17,000 when tested by a modified Andersen's anaerobic plate method and to prevent the growth of *Mycobacterium tuberculosis* var. *hominis* Lehmann et Neumann, steptomycin-resistant strain H37 RvR, NRRL B–1300, in serial dilution assays at dilutions between 1:700 and 1:800 using the Tween-albumin medium of Dubos and Middlebrook.

Although the antibiotic mixture produced by the NRRL B–1699 organism is effective in vitro against many microorganisms and is effective in vivo against many plant pathogens, its in vivo activity and toxicology in animals have not been completely investigated and it is not represented that the substances would have any value as therapeutic agents for animals or humans.

As noted above, the antibiotic mixture elaborated by the NRRL B–1699 organism is useful for control of plant pathogens. In applying the product in agricultural uses, the infected plants may be sprayed with the culture filtrate of the organism. Usually it is more convenient to spray-dry the culture filtrate or otherwise reduce it to a dry state. The dry material can then be made up as needed into a solution in water for spraying plants. Instead of applying the antibiotic material in solution form, the dry culture filtrate may be admixed with a powdered carrier such as talc, bentonite, kaolin, etc. and the resulting powder applied as such to the plants.

Our invention includes processes for growing our new strain of Streptomyces. The microorganism may be cultivated at temperatures ranging from about 24° C. to about 36° C. However, we prefer to use temperatures of from 28° C. to 30° C. The organism is best grown under submerged conditions of agitation and aeration in media containing a carbohydrate source such as sugars, starch, and glycerol; an organic nitrogen source such as soybean meal, peanut meal, and corn steep liquor; and mineral salts such as sodium chloride, potassium phosphate, manganous sulfate, zinc sulfate, ferric tartrate, and magnesium sulfate. We prefer to adjust the medium to a pH in the range of about 6.0 to 7.0 prior to sterilization. During the course of fermentation the pH gradually rises to a peak of about 7.5 to 8.5 at which point maximum antibiotic activity is attained as measured by agar diffusion assays against *Bacillus subtilis*, NRRL B–765, *Saccharomyces pastorianus*, NRRL Y–139, and *Trichoderma sp.*, NRRL 1700. Excellent production of the antibiotic mixture is attained in Fernbach shakeflasks. Similar yields, as measured by agar diffusion assays may be obtained in vat fermentors with agitation and aeration of about one-fourth to one-half volumes of air per volume of medium per minute. In general, about 2 days to a week are required for the fermentation liquors to attain maximum potency.

An inoculum may be obtained by employing the growth from slant cultures inoculated with our strain of *S. cinnamomeus* forma *azacoluta*. Suitable solid media for this purpose and for maintenance of our strain are Hickey and Tresner's "amidex" agar, and tomato-paste oatmeal agar. This growth is used to inoculate flasks. We have found that 1% of a liquid vegetative culture of the organism is a satisfactory amount for use as inoculum for large flask or small vat fermentor production of the mixture of antibiotics, although lesser or larger volumes of inocula may be used.

After the fermentation broth has reached a suitable antibiotic potency as measured by agar diffusion assays, the mycelium is removed by the usual means of filtration. The filtrated broth so obtained may be used as such, or it may be spray dried to give a product which, when reconstituted with water, possesses antibiotic activity essentially equivalent to that of the original culture filtrates.

The crude culture filtrates as well as the spray dried and/or lyophilized materials obtained from culture filtrate have been subjected to various chemical procedures to develop possible means for isolation and purification of the component antibiotics. Paper chromatography has demonstrated that there are at least three antibiotics in the mixture. However, there are indications that there may be other factor(s) in the crude culture filtrates and in spray-dried products which may be necessary for certain activities of the culture filtrates which have been tested. Culture filtrates per se are quite active against pinto bean rust and wheat stem rust, race 15B, of Little Club Wheat in the greenhouse. The chemical properties of the component antibiotics, designated Antibiotic A, duramycin and Antibiotic C, which are produced by strain NRRL B–1699, were studied. Agar diffusion assays and paper chromatograms were used to determine the results of the experiments. The Rf values obtained by paper chromatography of the mixture in 1-butanol-pyridine-water (6:4:3) are given in Table 5.

TABLE 5

*Rf values of antibiotics produced by strain NRRL B–1699*

| | Antibiotic A | Duramycin | Antibiotic C |
|---|---|---|---|
| *Bacillus subtilis*, NRRL B–765 | 0 | 0.40 | ---------- |
| *Saccharomyces pastorianus*, NRRL Y–139 | ---------- | 0.40 | 0.75 |

Antibiotic A is stable for 30 minutes at 90° in the culture liquor in the pH range 3–9. It cannot be extracted from the culture liquor at pH 3, 7 or 9 by 1-butanol, ethyl acetate, chloroform or ether nor can it be adsorbed by the monobed ion-exchange resin, Amberlite MB–3. It is removed from culture liquors by activated carbon (e. g. Nuchar C) from which it can be eluted with acidic methanol. It does not pass through the dialysis membrane.

Duramycin is a polypeptide as indicated by the infrared spectrum with bands at 3.06, 6.00, 6.55 and 14.33$\mu$. It gives a positive biuret and azide-iodine test. Paper chromatograms of acid hydrolysates in several solvent systems indicate that the following amino acids may be present: lanthionine, beta-methyllanthionine, aspartic acid, glycine, glutamic acid, proline, valine, phenylalanine, and possibly ornithine and hydroxyproline. The absence of cystathionine was established by microbiological assay using a cystathionine-requiring *Neurospora* mutant. The antibiotic gives negative ferric chloride, Benedict, Molisch, periodic acid, Millon, Nitroprusside, Pauly, Sakaguchi, xanthoproteic and Hopkins-Cole tests.

Duramycin is soluble in water, and aqueous acetone, methanol and ethanol, but only slightly soluble in absolute alcohols. It is highly active in lowering surface tension, passes through a dialysis membrane, has no definite melting point and does not absorb in the ultraviolet. The antibiotic from alumina columns has a specific rotation of [alpha]$_D^{25}$—6.4($c$, 3.9, water).

It is stable to heat in pH range 3–9 and is not adsorbed by the following Amberlites: IRC–50, IRA–400, IR–4B, MB–3 and IRA–401. Potentiometric titration indicates the presence of several free carboxyl groups and at least one free amino group. The presence of free carboxyl groups was confirmed by paper electrophoresis as shown in Table 6 and of free amino nitrogen by a Van Slyke determination.

TABLE 6

*Paper electrophoresis of duramycin using barbital buffers (ionic strength 0.10) and Munktell No. 20 paper*

| pH | Movement (cm.) in 18 hrs., 10 milliamps, 128-131 volts |
|---|---|
| 8.78 | −6.2 |
| 7.3 | −2.9 |
| 6.6 | −2.8 |
| 5.05 | −1.4 |
| 2.8 | −0.93 |

Duramycin was isolated by 1-butanol extraction of the crude culture liquor and purified by chromatography on hydrochloric acid-washed alumina columns (pH 4.7). A crystalline picrate and an amorphous helianthate were prepared.

A countercurrent distribution of duramycin in eight separatory funnels using the solvent system xx 2-butanol-0.01 N ammonium hydroxide concentrated the activity in funnels 5 and 6 when the lower phase was moved. The results are shown in Figure 1. After a countercurrent distribution using 1-butanol-ammonium acetate (0.2 M, pH 5.35) in a 54-tube apparatus, the maximum activity was found in tube 30 as shown in Figure 2.

Antibiotic C is destroyed by heating at 90° at pH 3 and 9 although it is stable to spray drying in the culture liquor. It can be extracted from culture liquors by 1-butanol although concentration of the extracts leads to destruction of the antibiotic. It cannot be extracted by ethyl acetate, chloroform, or ether. It is either partially destroyed or adsorbed by Amberlite MB-3, and completely destroyed or adsorbed on activated carbon. It does not pass through a dialysis membrane.

It is to be understood that it may eventually be possible to isolate and more definitely characterized each of the components in the mixture of antibiotics and possibly to detect additional factors which may be responsible for the marked activity of culture liquors in preventing the rust diseases in the greenhouse.

The following specific examples serve to illustrate how one may carry out our invention, but it is, of course, not limited to the details given therein.

EXAMPLE I

A fermentation medium of the following composition was prepared:

| | |
|---|---|
| Cerelose (commercially available hydrated dextrose) _____ g__ | 2 |
| Ground soybean meal _____ g__ | 3 |
| Tap water _____ ml__ | 1000 |

The pH was adjusted to 7 with a sodium hydroxide solution.

500 cc. quantities of the above medium were dispensed into Fernbach flasks and, after closing with cotton-gauze covers, the media and flasks were sterilized for 30 to 40 minutes at 121.5° C. Each of the flasks was then inoculated with 5 ml. of a vegetative culture of our strain of streptomycete, obtained by propagating the organism in 300 ml. Erlenmeyer flasks containing Bennett's broth at 25 to 30° C. for 48 hours on a rotary shaker. The 300 ml. Erlenmeyer flasks had in turn been inoculated from actively growing cultures on agar slants.

After the fermentation had proceeded for 4 days, while continuously agitating the Fernbach flasks on a rotary shaker, the resultant liquors were filtered and agar diffusion assays run on the filtrate against 3 test organisms. The results obtained from assay of several flasks are given below:

|  | Diameter of inhibition zone, mm. |
|---|---|
| Bacillus subtilis, NRRL B-765 assay | 32.2 to 33.5 |
| Saccharomyces pastorianus, NRRL Y-139 assay | 25.1 to 27.9 |
| Trichoderma sp., NRRL 1700 assay | 35.6 to 37.0 |

EXAMPLE II

A fermentation medium of the following composition was prepared:

| | G. |
|---|---|
| Cerelose (commercially available hydrated dextrose) | 50 |
| Ground soybean meal | 200 |
| Tap water to 9.5 liters. | |

The medium was placed in a 21 l. stainless steel vat fermentor and sterilized for 45 minutes at 135° C. Upon cooling to 28° C. the medium was inoculated from a Fernbach shake flask containing 500 ml. of an actively growing culture of our streptomycete cultivated in a medium consisting of tap water, 3% ground soybean meal, and 2% Cerelose. This medium was adjusted to pH 7 with sodium hydroxide before sterilizing for 45 minutes at 121.5° C. On cooling it was inoculated with 5 ml. of an actively growing culture of our streptomycete in Bennett's broth cultivated on a rotary shaker for 48 hours at 28° C. to 30° C. The Fernbach flask was incubated on a shaker for 48 hours at 28° C. to 30° C. and this culture added to the vat fermentor. The vat fermentation was agitated with a paddle type stirrer at 300 R. P. M. and the vat was aerated with sterile air at the rate of one-half volume of air per volume of medium per minute. Heptadecanol in absolute ethanol was used as an antifoam as required. After 16 hours, the fermentation was stopped and the liquor filtered and assayed with the following results:

|  | Diameter of inhibition zone, mm. |
|---|---|
| Bacillus subtilis, NRRL B-765 assay | 22.3 to 26.5 |
| Saccharomyces pastorianus, NRRL Y-139 assay | 27.2 to 28.6 |
| Trichoderma sp., NRRL 1700 assay | 28.6 to 30.9 |

EXAMPLE III

A fermentation in 30 Fernbach flasks was carried out as illustrated in Example I. After the fermentation had proceeded for 4 days, the culture liquors were pooled and filtered to yield 7115 ml. of filtrate with a total solids content of 15.0 mg. per ml. The filtrate was spray-dried under atmospheric conditions giving 43.7 g. of a light tan, slightly hygroscopic powder. Comparative assays of the filtrate and of the spray-dried product reconstituted with distilled water are given below:

| | Diameter of inhibition zone | |
|---|---|---|
| | filtrate, mm. | reconstituted dried product, mm. |
| Bacillus subtilis, NRRL B-765 | 30.5–30.6 | 30.6–30.8 |
| Saccharomyces pastorianus, NRRL Y-139 | 25.9–26.7 | 27.5–28.7 |
| Trichoderma sp., NRRL 1700 | 31.4–32.0 | 33.1–33.6 |

EXAMPLE IV

A quantity of culture filtrate was prepared as illustrated in Example I, and gave essentially the same degree of activity against the three laboratory test organisms as in Example I. The culture filtrate was adjusted to pH 7 and tested in the greenhouse against a number of plant diseases. In these tests, the filtrate was sprayed on the living plants which had previously been infected with the plant pathogens. After several days the plants were examined for pathogenic conditions. The results obtained are tabulated below:

*Extent of control of disease by culture filtrates of NRRL B-1699*

| Disease | Host | Control |
|---|---|---|
| Rust | bean | complete. |
| Stem rust | wheat | marked. |
| Anthracnose | lima bean | none. |
| Do | snap bean | moderate. |
| Northern leaf blight | corn | none. |
| Downy mildew | lima bean | moderate to complete. |
| Powdery mildew | bean | marked (eradication). |
| Do | bluegrass | complete (eradication). |
| Halo blight | bean | none (toxic to plant). |

Having thus described our invention, we claim:

1. A process for producing an antibiotic mixture which comprises cultivating *Streptomyces cinnamomeus* forma *azacoluta* in an aqueous medium containing an assimilable carbon source and an assimilable nitrogen source under aerobic conditions.

2. A process for producing an antibiotic mixture which comprises cultivating *Streptomyces cinnamomeus* forma *azacoluta* in an aqueous medium containing an assimilable carbohydrate and an assimilable nitrogen source under erobic conditions.

3. A process for producing an antibiotic mixture which comprises cultivating *Streptomyces cinnamomeus* forma *azacoluta* in an aqueous medium containing an assimilable carbon source and an assimilable organic nitrogen source under aerobic conditions.

4. A process for producing an antibiotic mixture which comprises cultivating *Streptomyces cinnamomeus* forma *azacoluta* in an aqueous medium containing an assimilable carbohydrate and an assimilable organic nitrogen source under aerobic conditions.

5. A process for producing an antibiotic mixture which comprises cultivating *Streptomyces cinnamomeus* forma *azacoluta* in an aqueous medium containing dextrose and soybean meal under aerobic conditions.

6. A process for producing an antibiotic mixture which comprises cultivating *Streptomyces cinnamomeus* forma *azacoluta* in an aqueous medium containing an assimilable carbon source and an assimilable nitrogen source, under aerobic conditions at a temperature from about 24 to about 36° C., for a period from about 1 day to about 7 days, until substantial antibacterial and antifungal activity is imparted to the medium.

7. The process of claim 6 wherein the solids are separated from the culture medium and the bulk of water is evaporated from the medium to produce a solid product having antibacterial and antifungal activity.

References Cited in the file of this patent

Shotwell et al.: American Chemical Society, Abstracts of Paper, 131st Meeting A. C. S., Apr. 7–12, 1957, pp. 18–0.

Pridham et al.: Phytopathology, vol. 46, October 1956, pp. 575 to 581.